(12) United States Patent
Palmer

(10) Patent No.: US 6,231,417 B1
(45) Date of Patent: *May 15, 2001

(54) OWL HOOTER GAME CALL

(75) Inventor: Dale Palmer, Harrisburg, IL (US)

(73) Assignee: Hunter's Specialties, Inc., Cedar Rapids, IA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/282,837

(22) Filed: Mar. 31, 1999

(51) Int. Cl.[7] ....................................... A63H 5/00
(52) U.S. Cl. ............................. 446/207; 446/202
(58) Field of Search ................... 446/416, 202, 446/207, 208, 213, 397

(56) References Cited

U.S. PATENT DOCUMENTS

| 1,229,757 | * | 6/1917 | Knapp . | |
| 1,491,809 | * | 4/1924 | Macchia . | |
| 2,317,458 | * | 4/1943 | Herter . | |
| 2,493,472 | | 1/1950 | Yentzen . | |
| 2,606,400 | * | 8/1952 | Olt et al. . | |
| 2,651,141 | | 9/1953 | Bicocchi . | |
| 2,711,614 | * | 6/1955 | Halsten . | |
| 2,729,025 | * | 1/1956 | Jones . | |
| 3,466,794 | | 9/1969 | Pritchard et al. . | |
| 3,815,283 | * | 6/1974 | Piper . | |
| 4,612,001 | * | 9/1986 | Burnham | 446/208 |
| 4,915,660 | * | 4/1990 | Overholt, Sr. | 446/207 |
| 4,940,451 | * | 7/1990 | Leady | 446/208 |
| 5,090,937 | * | 2/1992 | LaRue et al. | 446/207 |
| 5,735,725 | * | 4/1998 | Primos | 446/207 |
| 5,803,785 | | 9/1998 | Primos, Jr. et al. . | |
| 5,885,126 | | 3/1999 | Carlson . | |

* cited by examiner

Primary Examiner—Jacob K. Ackun
Assistant Examiner—K. Fernstrom
(74) Attorney, Agent, or Firm—Simmons, Perrins, Albright & Ellwood, PLC

(57) ABSTRACT

An owl hooter game call having dual sound chambers arranged in series therein where each sound chamber has a centrally disposed air passage therethrough and one of the sound chambers having a diameter which is larger than the diameter of the other sound chamber.

11 Claims, 2 Drawing Sheets

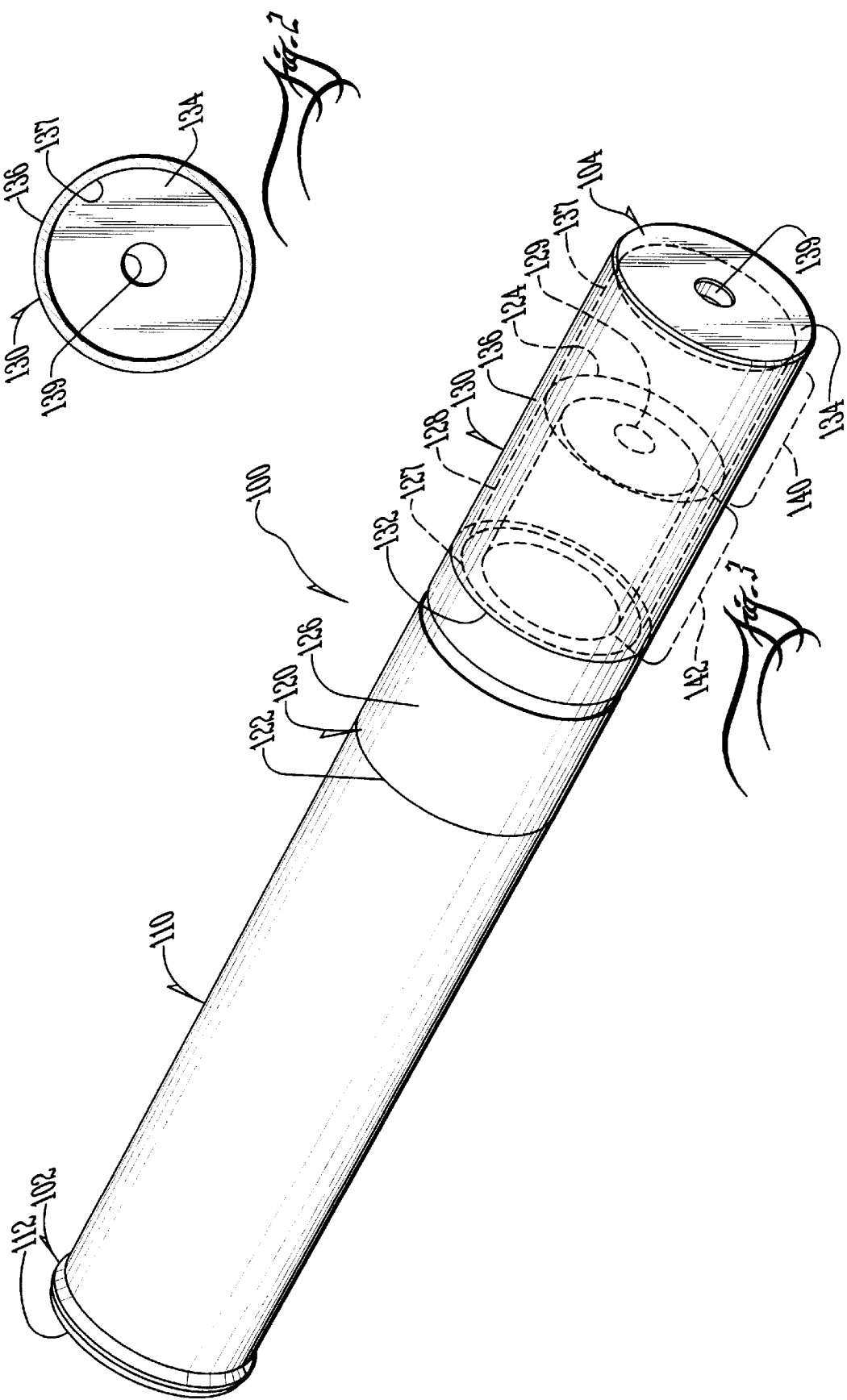

OWL HOOTER GAME CALL

FIELD OF THE INVENTION

The present invention generally relates to game calls and even more particularly relates to game calls for producing owl hoots.

BACKGROUND OF THE INVENTION

In the past, designers of owl hooting game calls have endeavored to provide more realistic sounding calls. Some designers have attempted to produce an owl hooter call using a simple "reed-in-a-tube" design, much like a typical duck call.

While these calls may have cost advantages, they also have significant drawbacks.

The sound of an owl hooting is distinct from other common animal made noises. Owl hoots are often loud and any emulation of an owl hoot would need to be realistic at high volume levels. Prior art designs have often failed at simultaneously producing both high volume levels and high levels of realism and others have been very difficult to operate, especially by a novice call operator.

Consequently, there exists a need for improvement of owl hooting game calls.

SUMMARY OF THE INVENTION

It is an object of the present invention to provide an owl hooter game call having realistic tones at high volume levels.

It is a feature of the present invention to utilize a back pressure chamber inside the call.

It is an advantage of the present invention to provide a call which is easy to use.

It is another feature of the present invention to have the back pressure chamber have an interior diameter dimension which is larger than the interior diameter dimension of the tube portion of the call between the reed and the back pressure chamber.

It is another advantage of the present invention to produce more realistic sounding owl hoots.

The present invention is an owl hooter game call which is designed to satisfy the aforementioned needs, provide the previously stated objects, include the above-listed features and achieve the already articulated advantages. The present invention is carried out in an "expertise-less" manner in a sense that the high level of expertise which was often required by an operator of an owl hooter call has been greatly reduced.

Accordingly, the present invention is an owl hooter game call having a back pressure chamber therein with a centrally disposed air passage therethrough.

BRIEF DESCRIPTION OF THE DRAWINGS

The invention may be more fully understood by reading the foregoing description of the preferred embodiments of the invention, in conjunction with the appended drawings wherein:

FIG. 2 is a cross-sectional view of the back pressure chamber cap taken on line 2—2 of FIG. 1.

FIG. 3 is a cutaway view of the present invention.

DETAILED DESCRIPTION

Figure 1:
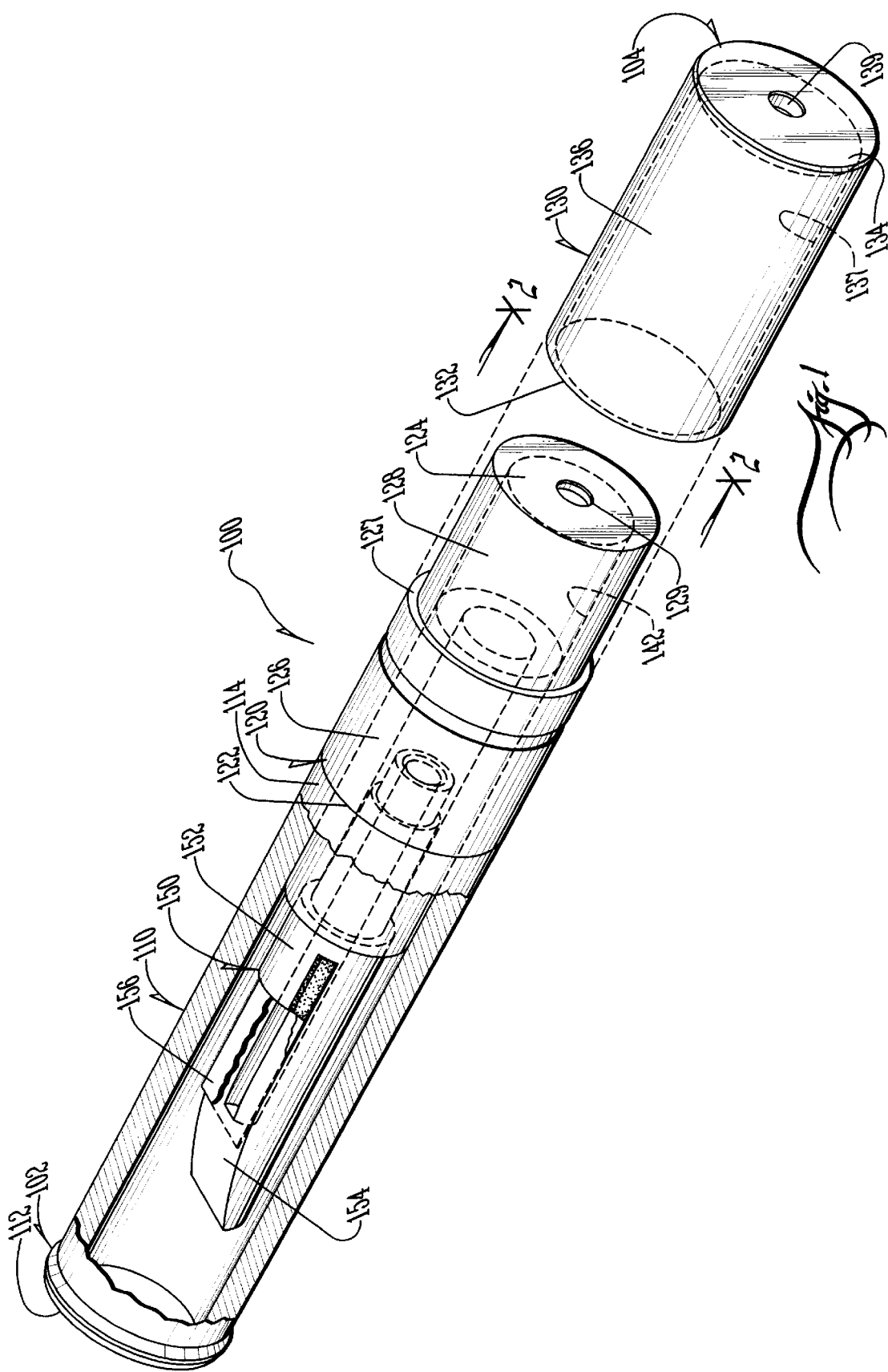
FIG. 1 is a simplified cutaway exploded perspective diagram of a game call of the present invention, wherein the dotted lines show the alignment of the exploded parts.

Now referring to the drawings wherein like numerals refer to like matter throughout, and more specifically to FIG. 1, which is a cutaway exploded view, there is shown an owl hooter game call of the present invention, generally designated 100. Call 100 has a mouth end 102, for engaging with the mouth of a human call operator and further has an opposing sound exit end 104, where the sound generated within the call is emitted. Call 100 has a reed cover tube 110, which is shown in a cutaway view revealing the reed assembly 150 disposed therein. Reed cover tube 110 has a reed cover tube mouth end 112 and a reed cover tube exit end 114. Call 100 also has an initial sound chamber body 120, having an initial sound chamber mouth end 122 and an initial sound chamber exit end 124. Initial sound chamber body 120 also has an initial sound chamber thick walled portion 126 and an initial sound chamber thin walled portion 128 with an initial sound chamber boundary edge 127 disposed therebetween. Initial sound chamber exit end 124 has an initial sound chamber sound exit hole 129 therein for passage of air therethrough. Call 100 further having a back pressure chamber cap 130 with a back pressure chamber cap mouth end 132 and a back pressure chamber cap sound exit end 134. Back pressure chamber cap 130 has a back pressure chamber cap outside surface 136 and a back pressure chamber cap sound exit hole 139 disposed therethrough at said back pressure chamber cap sound exit end 134. Back pressure chamber cap inside surface 137 is visible through back pressure chamber cap sound exit hole 139.

Also shown in the cutaway portion of reed cover tube 110 is reed assembly 150 which contains reed assembly body 152, reed assembly grooved tongue 154, and reed 156. All components of the call 100, except the reed 156, are preferably made of the same material, which can be any suitable material, including but not limited to birds eye maple and plastic materials.

Now referring to FIG. 2, there is shown a cross-sectional view of the back pressure chamber cap 130 taken on line 2—2 of FIG. 1. Back pressure chamber cap 130 is shown having a back pressure chamber cap outside surface 136 and a back pressure chamber cap inside surface 137 with a back pressure chamber cap sound exit end 134 having a back pressure chamber cap sound exit hole 139 therein.

Now referring to FIG. 3, as well as FIGS. 1 and 2, when call 100 is fully assembled, initial sound chamber thin walled portion 128 is in contact with back pressure chamber cap inside surface 137. Additionally, back pressure chamber cap mouth end 132 is in contact with initial sound chamber boundary edge 127. The distance between back pressure chamber cap mouth end 132 and back pressure chamber cap sound exit end 134 is greater than the distance from initial sound chamber boundary edge 127 to initial sound chamber exit end 124, thereby creating a back pressure sound chamber 140 within back pressure chamber cap 130. Due to the thickness of the walls of initial sound chamber thin walled portion 128 and the fact that back pressure chamber cap outside surface 136 surrounds initial sound chamber thin walled portion 128, the diameter of back pressure sound chamber 140 is larger than initial sound chamber 142, which is formed inside initial sound chamber body 120 and between initial sound chamber mouth end 122 and initial sound chamber exit end 124.

In operation, the apparatus of the present invention could function as follows: air is blown into the call 100 at mouth end 102, the air passes between reed 156 and reed assembly grooved tongue 154, causing a vibration at a predetermined frequency, the air passes through reed assembly body 152 and enters the initial sound chamber 142 in initial sound chamber body 120, passes through initial sound chamber sound exit hole 129 in initial sound chamber exit end 124 and then enters back pressure sound chamber 140 formed by the combination of initial sound chamber body 120 and back pressure chamber cap 130. The dimensions of back pressure sound chamber 140 and initial sound chamber 142 help determine the sound of the call 100. The precise dimensions throughout the call are a function of many variables which depend on the particular properties that may be desired in a call.

It is thought that the apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

I claim:

1. A game call comprising:

A reed;

A tube disposed around said reed, said tube having a mouth end and an exit end;

A first sound chamber disposed at said exit end of said tube;

A second sound chamber disposed adjacent to said first sound chamber;

Said first sound chamber having a first sound chamber exit end with a first sound chamber exit hole centrally disposed therein, wherein said first sound chamber exit hole has a smaller diameter than an inside diameter of said first sound chamber; and Said second sound chamber having a second sound chamber exit end with a second sound chamber exit hole therein, wherein said second sound chamber hole has a diameter that is smaller than an inside diameter of said second sound chamber;

Wherein said inside diameter of said second sound chamber is larger than said inside diameter of said first sound chamber;

Wherein said second sound chamber has a length dimension which is longer than a length dimension of said first sound chamber;

Wherein said first sound chamber has a continuous inside diameter; and

Wherein said first sound chamber has an outside diameter which is discontinuous in diameter, said first sound chamber has a first portion and a second portion.

2. A call of claim 1 wherein said first portion of said first sound chamber has a smaller outside diameter than said second portion of said first sound chamber, said first portion disposed distally of said mouth end of said tube.

3. A call of claim 2 wherein said first chamber exit hole is the sole exit hole in said first chamber exit end.

4. A call of claim 3 wherein said first sound chamber exit hole and said second chamber exit hole are of equal diameter.

5. A call of claim 4 wherein said reed is coupled to a tongue with a central groove therein.

6. A call of claim 5 wherein said second sound chamber is formed by placing a cap over said portion of said first sound chamber.

7. A call of claim 6 wherein said tube, said first sound chamber and said cap are made of the same material.

8. A call of claim 7 wherein said same material is bird's eye maple wood.

9. A call of claim 7 wherein said same material is plastic.

10. A call of claim 9 wherein said exit end of said first sound chamber is an integral component of said first sound chamber.

11. A call of claim 10 wherein said exit end of said second sound chamber is an integral component of said cap.

\* \* \* \* \*